United States Patent [19] Bloom

[11] 3,711,863
[45] Jan. 16, 1973

[54] SOURCE CODE COMPARATOR COMPUTER PROGRAM

[75] Inventor: Delwin W. Bloom, Phoenix, Ariz.

[73] Assignee: Honeywell Information Systems Inc., Waltham, Mass.

[22] Filed: Jan. 21, 1972

[21] Appl. No.: 219,721

[52] U.S. Cl. ........................................................444/1
[51] Int. Cl. ..................................................G06f 9/16
[58] Field of Search ......................444/1; 235/153 AK

[56] References Cited

UNITED STATES PATENTS 3,544,777 12/1970 Winkler ..........................235/153 AK
3,568,156 3/1971 Thompson..................................444/1

*Primary Examiner*—Raulfe B. Zache
*Attorney*—James A. Pershon et al.

[57] ABSTRACT

A procedure for controlling a data processing system by a computer program that compares two versions of a source program and identifies the difference between the two. The program compares the two versions until a noncomparison is determined. The program then continues to compare each line in the base version to each line in the modified version until a comparison is found. The program then verifies that it is in the same area of both files by checking for an identical symbolic address and proceeds to check the statements preceding the identical symbolic addresses by working backwards until a noncompare is again detected. The test that defines the smallest area of noncomparison delineates the changes. The program then examines the statements in the noncomparing area to signify whether the noncomparison is due to an addition, deletion or modification.

11 Claims, 16 Drawing Figures

```
OPTS    LDA     CARD            LOOK FOR LIST OPTION
        CMPA    =6HLIST
*  PARAMETER IS NOT LIST SO WE WILL START COMPARISON
        CALL    OPEN(FOLD,2)
        CALL    OPEN(FNEW,2)
        CALL    IOEDIT(LIST,2)
        LDA     LAB1+3
        STA     LAB1
        LDA     LAB2+3
        STA     LAB2
        EAX2    STOR1
        EAX3    LAB1
        RPD     9,1
        LDA     0,2
        STA     1,3
        EAX2    STOR2
        EAX3    LAB2
        RPD     9,1
        LDA     0,2
        STA     1,3
        LDA     CARD+2
        CMPA    =6HALL
        STA     PALL
*  STORE THE STARTING MODULE AND ENDING MODULE NAME....
*OPEN FILE FOR "OLD" TAPE AND FILL WORK AREA B.
CONT    IOTP    CARD,18
 EYE    VFD     18/CTRL,1/0,1/0,1/0
        FILCB   CTRL,I*,BUFI
CARD    BSS     19
OX7     DEC     0
OPT1    EAX3    WORKB
        STX7    OX7
OPT11   CALL    ,DRDRC(FILA,EFB,BCB)
        LDA     PASS              IF PASS IS MINUS THIS IS
        TMI     OPT11           NOT THE MODULE WE WANT
        LDX2    FILA
        RPD     14,1
        LDA     0,2
        STA     0,3
        LDA     -13,2           HAVE WE REACHED THE END CARD?
        CMPA    =6H END
        TZE     OPT1E           YUP
        CMPX3   STOPB,DU
        TMI     OPT11
        LDX7    OX7
        TRA     0,7
OPT1E   LDA     MINUS
        STA     ENDB            SET END CARD FLAG
        LDX7    OX7
        TRA     0,7
OPT12   STZ     .DRCBC
        STZ     .DRCBC-1
        STZ     .DALCT
```

FIG. 3A

```
       EAX3    WORKB
       TRA     OPT11
MOPT2  NOP
*A CONTROL CARD HAS BEEN READ
*OPEN FILE FOR "NEW" TAPE AND FILL WORK AREA D.
OPT2   STX7    OX7
OPT3   CALL    RDREC(FILC,EFC,BCC)
       LDA     PASS
       TMI     OPT3
       LDX2    FILC
       RPD     14,1
       LDA     0,2
       STA     0,3
       LDA     -13,2
       CMPA    =6H END
       TZE     OPT2E
       CMPX3   STOPD,DU
       TMI     OPT3
       LDX7    OX7
       TRA     0,7
OPT2E  LDA     MINUS
       STA     ENDD
       LDX7    OX7
       TRA     0,7
OPT23  STZ     .GALCT
       STZ     .GRCBC
       STZ     .GRCBC-1
       STZ     DELM             CLEAR MODULE DELETED FLAG
       EAX3    WORKD
       TRA     OPT3
*A CONTROL CARD HAS BEEN READ FROM TAPE B
OPTO   CALL    OPEN(FOLD,2)
       LDA     MINUS
       STA     PASS
       TSX7    OPT1             LOAD WORK AREA FROM OLD FILE
       LDA     MINUS
       STA     PASS
       TSX7    OPT2             LOAD WORK AREA FROM NEW FILE
       TRA     COMP             GO COMPARE THE TWO
OPT21  CALL    OPEN(FNEW,2)
       LDA     DELM             WAS THE LAST OLD MODULE DELETED?
       TMI     BCC              YES, DON'T READ NEXT RECORD.....
       EAX3    WORKD
       TRA     OPT3
OPT22  STX7    OX7
*  SET ALL  POINTERS TO START POSITION
 2.31  LXL2    SAV2
       TSX7    BBCD
       LXL3    SAV3
       TSX7    DBCD
       LDQ     SPACE
 2.33  TSX1    PRT2
       LDA     LINE
       ASA     TWO
       ASA     THREE
```

FIG. 3B

```
        ASA     SAV2          ADVANCE COMPARE ADDRESS BY ONE LINE
        ASA     SAV3
        LDA     CELLB
        SBA     SAV2
        TZE     2,32
        LDA     CELLD
        SBA     SAV3
        TNZ     2.35
2.32    TSX7    5.0
2.35    LXL2    SAV2
        LXL3    SAV3
        RPD     7,1,TNZ
        LDA     0,2
        CMPA    0,3
        TNZ     2.5           ........NON COMPARE DETECTED........
        TRA     2.31
2.5     EAA     WORKB         CHECK TO BE SURE WE HAVEN'T JUST
        ARS     18
        SBA     SAV2          LOADED THE WORK AREA, AND COME UP WITH
        TZE     2.51+1        A FALSE UNABLE TO COMPARE CONDITION.
2.51    TSX7    5.0
        LXL2    TWO
        LXL3    THREE
        STZ     CELLD
        LDA     TWO
        STA     SAV2
        LDA     THREE
        STA     SAV3
        EAX1    STOPD
        SXL1    CELLD         OF THE POINTER FROM THE ADDRESS
2.52    LDA     LINE
        ASA     SAV3          INCREMENT NEW PROGRAM BY 1 LINE
2.57    LXL2    SAV2
        LXL3    SAV3
        RPD     7,1,TNZ
        LDA     0,2
        CMPA    0,3
        TNZ     2.53
        TRA     2.76          ----COMPARE FOUND------
2.53    LDA     CELLD
        SBA     SAV3
        TZE     2.8           END OF NEW DATA REACHED
        TPL     2.52
2.8     LDA     LINE          INCREMENT THE POINTER TO THE
        ASA     SAV2          NEXT LINE OF THE OLD PROGRAM
        STZ     CELLB
        EAX1    STOPB         AND START OVER......
        SXL1    CELLB
        LDA     CELLB
        SBA     SAV2
        TZE     2.81
        LDA     THREE
        STA     SAV3
        TRA     2.57
```

FIG. 3C

```
2.81   TSX7    5.0
       TRA     2.35
2.76   LXL2    SAV2
       LXL3    SAV3              LOAD THE TWO STATEMENTS THAT LOOK ALIKE
       RPD     12,1,TNZ
       LDA     0,2               COMPARE FULL 72 CHARACTERS:
       CMPA    0,3
       TNZ     2.53              SORRY--ENTIRE LINE DID NOT COMPARE
       LDA     LINE
       ASA     SAV2
       ASA     SAV3
       LXL2    SAV2
       LXL3    SAV3              THAT STATEMENT DID COMPARE
       RPD     12,1,TNZ
       LDA     0,2               COMPARE NEXT STATEMENT
       CMPA    0,3
       TNZ     2.53              THE NEXT LINE DID NOT COMPARE
       LDA     MLINE
       ASA     SAV2
       ASA     SAV3              THE TWO STATEMENTS COMPARED.
       LDA     SAV2
       STA     WORBL             STORE ADDRESS OF STATEMENT IN B FILE
       LDA     SAV3
       STA     WORDL             STORE ADDRESS OF STATEMENT IN D FILE.
       TRA     SYMBO             GO PERFORM SYMBOLIC ADDRESS CHECK
SYMBO  LXL2    TWO
       LXL3    THREE
SYMB   LDA     0,2
       CMPA    =6H               IS THERE A SYMBOL
       TNZ     SYM2              YES
SYM1   ADX2    LIN               NOT HERE, TRY NEXT STATEMENT
       CMPX2   STOPB,DU          REACHED END OF DATA?
       TMI     SYMB              NO
       TRA     SYM11             YES
SYM2   LDA     0,2
       ANA     =0770000,DU
       CMPA    =3H*00,DU         COMMENT CARD?
       TZE     SYM1              YES, KEEP LOOKING
       LDA     0,2               LOOK GOOD
SYM3   STA     SYMO              STORE IT
       LDA     SYMO
       ANA     =0770000,DU
       CMPA    =3H 00,DU         IS FIRST DIGIT BLANK?
       TNZ     SYM4
       LDA     SYMO
       ALS     6                 YES, SHIFT ONE CHARACTER.
       TRA     SYM3
SYM4   LDA     0,3
       CMPA    =6H               IS THERE A SYMBOL IN THIS LINE
       TNZ     SYM6              YES
SYM5   ADX3    LIN               NOT HERE TRY NEXT LINE
       CMPX3   STOPD,DU          END OF DATA?
       TMI     SYM4
       LXL3    SAV3              END OF DATA RESET POINTER
       TRA     SYM1              LOOK FOR NEXT SYMBOL
```

FIG. 3D

```
SYM6    LDA     0,3
        ANA     =0770000,DU
        CMPA    =3H*00,DU          COMMENT CARD?
        TZE     SYM5               -----YES-----
        LDA     0,3                LOOKS LIKE A SYMBOL
SYM7    STA     SYMN               STORE IT
        LDA     SYMN
        ANA     =0770000,DU
        CMPA    =3H 00,DU          IS LEADING CHARACTER A BLANK?
        TNZ     SYM8               NO
        LDA     SYMN
        ALS     6                  YES, SHIFT OUT BLANK AND
        TRA     SYM7               LOOK AT NEXT CHARACTER
*  HAVE  FOUND  SYMBOLS  IN  B  AND D  FILES
*  NOW  FIND  OUT  IF  THEY  COMPARE
SYM8    LDA     SYMO
        SBA     SYMN               ARE THE TWO SYMBOLS THE SAME?
        TZE     SYM9               YES
        TRA     SYM5               NO, GO LOOK FOR NEXT SYMBOL
*  THE SYMBOLIC ADDRESS NAMES IN THE
*  B  AND  D  FILES ARE THE SAME.
SYM9    SXL2    SAV2
        SXL3    SAV3
        LDA     TWO
        SBA     SAV2
        TZE     SYM1
SYM10   LXL2    SAV2               HAVE FOUND LIKE SYMBOLS NOW
        LXL3    SAV3               WE'LL SEE IF WE CAN BACK UP
        RPD     10,1,TNZ           THE FENCE.  BY LOOKING FOR
        LDA     0,2                EQUAL STATEMENTS, PRECEDING
        CMPA    0,3                THE EQUAL SYMBOL'S..
        TNZ     SYM12              ........NO COMPARE........
        LDA     MLINE              BACK UP ONE MORE LINE
        ASA     SAV2               AND TRY AGAIN
        ASA     SAV3
        TRA     SYM10
SYM12   LDA     LINE               ADVANCE LINE BY ONE STATEMENT
        ASA     SAV2               SO THAT WE ARE POINTING TO THE
        ASA     SAV3               LAST GOOD COMPARE NOT THE BAD ONE
        LDA     SAV2
        SBA     TWO
        STA     SAV22              # OF WORDS IN MODIFIED AREA OF THE B FILE
        LDA     SAV3
        SBA     THREE
        STA     SAV32              # OF WORDS IN MODIFIED AREA OF THE D FILE
        ASA     SAV22              ADD THE TWO TOGETHER
*  SAV22 NOW HOLDS THE TOTAL NUMBER OF WORDS IN THE MODIFIED AREA
*AS DEFINED BY THE LAST GOOD COMPARE TO THE NEXT LIKE SYMBOL ADD.
        LDA     WORBL
        SBA     TWO
        STA     SAV23
        LDA     WORDL
        SBA     THREE
        STA     SAV33
```

FIG. 3E

```
       ASA     SAV23
       LDA     SAV22
       SBA     SAV23
       TMI     6.0
SYM11  LDA     WORBL          NO SYMBOL FOUND IN B FILE
       STA     SAV2           OR, COULDN'T FIND TWO ALIKE
       LDA     WORDL          OR, STATEMENT CHECK PRODUCED
       STA     SAV3              A LOWER MAGNITUDE OF CHANGE....
       TRA     6.0
5.0   *POINTERS CONTAIN START OF REMAINING DATA
      *HAS THE POINTER MOVED?  IF NOT NO COMPARE FOUND
      *IT HAS MOVED WE ARE STILL IN BUSINESS
      *DATA IN WORK AREA B HAS BEEN MOVED
      *NOW, FILL WITH MORE DATA FROM FILEA
      *WORK AREA B HAS BEEN REFILLED
      *MOVE DATA UP IN WORK AREA D
      *DATA IN WORK AREA D HAS BEEN MOVED
      *NOW FILL WITH MORE DATA FROM FILE C
      *THE POINTER FOR AREA B/D HAS NOT MOVED
5.11   LDX4    10,DU
       STX4    FILF+1
       CALL    PUT(FILF,NOCOM)
       CALL    EPRINT(FILF,NOCOM,=1)
       TRA     TERM
6.0    LDA     SAV3           END OF NON COMPARE AREA
       SBA     THREE          START OF NON COMPARE AREA
       STA     CELLD          AND THE DIFFERENCE BETWEEN THE TWO
       LDA     SAV2           END
       SBA     TWO            START
       STA     CELLB          AND DIFFERENCE
6.01   LDA     TWO
       STA     SAV21          SET UP WORKING POINTERS
       LDA     THREE
       STA     SAV31          SAME SET UP
       LDA     CELLB
       TNZ     6.03           THERE WERE DELETIONS
       LDA     CELLD
       TNZ     6.04           THERE WERE ADDITIONS.
       TRA     5.11           POINTERS HAVE NOT MOVED
6.03   LDA     CELLD
       TNZ     6.02           THERE WERE DELETIONS AND ADDITIONS
       LDA     SAV2
       STA     SAV21
       TRA     6.05
6.04   LDA     SAV3
       STA     SAV31
6.02   LXL2    SAV21
       LXL3    SAV31
       RPD     2,1,TNZ
       LDA     0,2
       CMPA    0,3
       TZE     6.06
*NO COMPARE ON THAT LINE TRY NEXT
       LDA     LINE
       ASA     SAV31
```

FIG. 3F

```
       LDA     SAV31
       SBA     SAV3
       TMI     6.02
*NO COMPARE ON THAT LINE AGAINST NEW CODE
*INCREMENT TO NEXT LINE OF OLD AND TRY AGAIN
       LDA     SAV21
       SBA     SAV2
       TZE     6.20
       LDA     LINE
       ASA     SAV21
       LDA     SAV21
       SBA     SAV2
       TPL     6.20
*IF MINUS CONTINUE CHECKING
       LDA     THREE
       STA     SAV31
       TRA     6.02
 6.20  TSX7    6.13
       TRA     6.05+1
*ALL DATA COMPARED, NO SIMILAR LINES
*GO BACK AND PRINT OUT AS ADDS AND DELETES
*A LINE OF CODE IN THE MODIFIED AREA
*COMPARES
*TWO AND THREE POINT TO NEXT LINE TO PRINT
*SAV2 AND SAV3 POINT TO NEXT LEGITIMATE COMPARE
*SAV21 and SAV31 POINT TO GOOD COMPARE WITHIN
*THAT AREA
 6.06  LXL2    SAV21
       LXL3    SAV31
       RPD     10,1,TNZ
       LDA     0,2
       CMPA    0,3
 6.05  TSX7    6.13
       LDA     TWO
       STA     SAV2
       LDA     THREE
       STA     SAV3
       STZ     CELLB
       EAX1    STOPB
       SXL1    CELLB
       STZ     CELLD
       EAX1    STOPD
       SXL1    CELLD
       LXL2    SAV2
       LXL3    SAV3
       RPD     7,1,TNZ
       LDA     0,2
       CMPA    0,3
       TNZ     2.51+1
       TRA     2.35
WORKB 8BSS     1946            CORRECT WORKING
STOPB  BSS     10              BUFFER SIZE
WORKD 8BSS     1946            IS IMPORTANT
STOPD  BSS     10
```

FIG. 3G

SOURCE CODE COMPARATOR COMPUTER PROGRAM

BACKGROUND OF THE INVENTION

1. Field of the Invention

This invention relates to computer programs and more particularly to program means for controlling the operation of a computer to compare a base program to a modified program to identify the differences between the two programs.

In the field of computer programs, that is, programs designed to control the operation of a computer, it is often necessary to modify the program either to have the program perform a new and better operation or to shorten the length of the program by deleting unnecessary steps.

Any time changes are made to a computer program, the human element necessary for accomplishing the change permits errors to creep into the alteration. The addition, deletion or modification might be incorrectly inserted by an operator. The wrong statements might be deleted or incorrect statements other than those called out by the programmer might be entered. Another problem is that an addition might be entered into the program at the wrong sequence of operation.

2. Prior Art

Formerly the comparison of the base or original program to the new undated program had to be done by visual inspection. A trained programmer had to obtain a printout of the source listing of a base program and a printout of the source listing of a revised version. The source listing contains in printed form each command given to the computer to perform a specific operation. In many cases these commands are mnemonics. In other cases, however, the commands are merely a group of symbols, some alpha and numeric symbols, and others are unusual symbols such as the dollar sign and the cent sign, all used in a statement to identify a particular operation that is required by the computer.

The visual inspection is a very boring and time-consuming job and enters another possibility for human error, especially in view of the symbols used. A change to one symbol in the statement changes the entire meaning of the statement. One error overlooked by the checker could cause many hours of lost time in locating the error once the computer program has been entered into the data processing system for a trial run.

Therefore, the need exists for a method of using the computer by program control to check and identify any differences between a base reference program and a revised version of the base program.

SUMMARY OF THE INVENTION

The comparator computer program according to the present invention compares two versions of a source program and identifies the difference between the two. The program compares the two versions until a noncomparison is detected. A search is then performed for a subsequent comparison. An alike sequence such as a symbolic address in both source programs is determined and used as a base from which another noncomparison is determined by working backwards from the base. The smallest area of noncomparison in the two searches defines a difference between the source programs.

The alterations to the program are defined as an addition, deletion or modification by examining the statements within the change area. A search is made for a comparison. All statements preceding the comparison in the base reference file are marked as deletions. All statements preceding the comparison in the revised version are marked as additions. A comparison of a shortened portion of any statement is marked as a modification. After all comparisons in the change area are searched to define the changes, the program returns to the initial compare subroutine until the next noncomparison is detected and the process is repeated.

Prior art comparator computer programs tended to define too large an area of a revised source program when compared to a base reference source program. The area of difference is positively defined by working through the source coding from two common reference points, the beginning and a known common point after the noncomparison (the symbolic address). The differences between the two source programs are located even if the changes are any combinations of additions, deletions or modifications.

It is, therefore, an object of the present invention to provide an enhanced method of identifying changes made to a source program.

It is another object of the invention to provide a method of comparing a revised source program to its base reference program to accurately identify additions, deletions and modifications.

It is yet another object to provide a method of identifying changes made to a source program by comparing the revised version to its base reference by the use of a data processing system.

BRIEF DESCRIPTION OF THE DRAWING

The foregoing and other objects of this invention, the various novel features thereof, as well as the invention itself, both as to its organization and method of operation, may be more fully understood from the following specific description of an illustrated embodiment when read in conjunction with the accompanying drawing, wherein:

FIGS. 3A, 3B, 3C, 3D, 3E, 3F and 3G show an illustrative computer program for implementing the algorithm represented in FIGS. 2A through 2H.

DESCRIPTION OF THE PREFERRED EMBODIMENT

Figure 1:
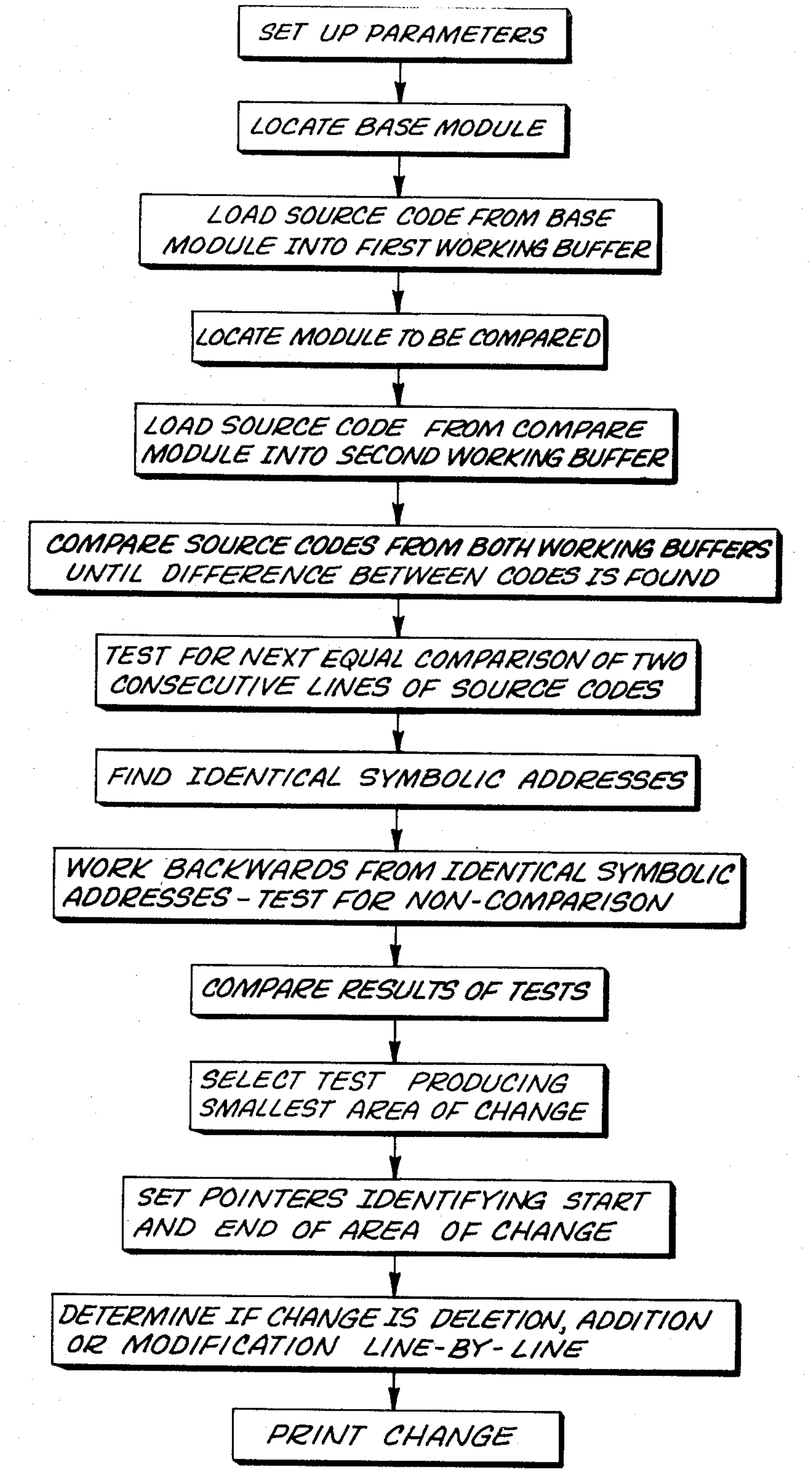
FIG. 1 is a step-by-step flow diagram of a method of performing the source code comparison according to the present invention.

Referring now to FIG. 1, a flow chart giving the step-by-step operation of the comparator program is shown. The purpose of the comparator program is to identify the changes made to the source coding of any program. Therefore, the first step is to set up the parameters required. The need or use for the comparator program is in the area where the computer software supplied by the manufacturer is modified by the user to serve his special need. In this step the printout required is specified. The output could be a computer printout with the original version of the program and the revised version printed side by side and justified to indicate the additions, deletions or modifications made to the base reference source coding to arrive at the changed version. Any change in the revised source code is indicated on the right-hand side, for instance, of the printout for ease of noting the difference. The user may also choose to obtain a computer printout of only that portion of the coding that has been changed. Thus, the programs to be compared as well as the required output, is set up in the first step of the flow chart.

The next step in the flow chart on FIG. 1 is to locate the base module. The base module as herein described is that portion of the memory store having the base reference source programs stored therein. In this step the computer searches for the base reference program according to the module where the base reference program is stored. The base reference program could be stored in any one of several disc pack memory units or on a magnetic tape in any one of the several tape drive units. A present-day data processing system includes an extended memory storage unit including both magnetic disc pack units and magnetic tape units.

After locating the base module the next step shown in the flow chart is to load the source code from the reference file into a first working buffer. This step places the information into temporary storage units such as buffer registers which are easily accessible by the computer. Although the comparing of the base reference program to the revised program can be performed directly from the storage media by having the tape drive units continually searching in a forward and a reverse direction or by having a magnetic disc continually being searched in one sector, for ease of processing the information, it is best to place the information into a buffer register where the computer can scan blocks of data rather than only one or a small group of bits at one time.

The next step according to FIG. 1 is to locate the module containing the revised program which is going to be compared to the base reference program. This revised program is then placed into a second working buffer register. The flow then continues and the computer compares the source codes from both working buffers until a difference between the base reference coding and the revised version coding is found. This signifies the place where the revised program has been changed from the original program. The comparator compares a portion of each line of code from the revised version against its counterpart in the base reference program until the comparator detects that a change has taken place.

After locating the difference, the first thing that the comparator does is locate the position of the difference in the work area. The comparator program then continues to test each line, as shown in the next step, looking for the next equal comparison of two consecutive lines of source codes. A comparison may, or may not be determined, depending upon whether the change to the revised program has been a replacement, an addition or a deletion. If a replacement or an addition has been made the comparison may be found easily. However, if there has been a deletion to the revised program, a comparison may not be found by the comparator program for the rest of the source listing or an identical line of code may be found and the comparator program will assume a comparison has been made. The prior art programs would note a revision to the program for the rest of the source listing when in fact this is probably not the case. Therefore, according to the present invention the next step shown in FIG. 1 is to find an identical symbolic address.

Finding the identical symbolic address for both the base reference program and the revised program shows a common point where the particular coding format that is presently being compared ends and another format of the source listing begins. Thus, the comparator program searches for a common point in the two programs. This common point after the first noted differences becomes the second working point and the next step shown in FIG. 1 shows that the comparator program works backwards from this common point and tests for another noncomparison between the base reference program and the revised program.

The next step in the flow diagram is to compare the results of the two tests. That is, the test for the next equal comparison of two consecutive lines of source codes is compared to the test for noncomparison working backwards from an identical symbolic address. The next step in the comparator program is to select the test from the two tests which delineates the smallest area of change. Therefore, if a deletion was made to the program, according to the first step the entire source listing from the line where the deletion was made to the point where a similar line of code was detected and equal comparison assumed is taken as the area of noncomparison. The second test, however, would point out that basically the last steps were the same and as the comparator program works backwards from a common point, comparisons will continue to occur until the line where the deletion was made is again reached. This serves to verify that the comparator has found the comparative code in the two modules and has not been misled by a code similar to that which was deleted appearing farther on in the source code. The pointers, which are identifiers pointing out an area in the working buffers, identify the start of the area of change as noted by the first difference found, and the end of the area of change, as noted by either one of the two tests, the test selected is the one producing the smallest area of change. The area of change resulting from the two tests will be the same unless the comparator made an erroneous assumption in the first test.

The next step as shown in the flow chart of FIG. 1 is to determine if the change is a deletion, an addition, or a modification by checking the start and end of the area of change. The next or last step is to print the area of change in the revised version, or to print the entire base reference program and revised program while pointing out the changes. Either is an option selected according to the parameters.

The step-by-step method of performing the comparator program according to the invention and as shown in FIG. 1 assumes two working buffers of infinite length or of a short program which can be entirely stored in the working buffer registers. In most cases, however, the source coding would be too large to be able to be stored into the working buffer registers at one time. In this case a portion of the source listing is loaded into the working buffers and this portion of the source listing is first compared to locate the difference. If no differences are found, the buffer registers are emptied and loaded with a second portion. Again, if no differences are located, the buffer registers are loaded with the third group of data. When a change is noted someplace in the buffer registers, the comparator program moves that line to the top of the buffer area. The comparator program then refills the buffer registers with the source listing information from both the base reference and the revised program with the information following the area where a noncomparison was detected.

After the noncompare has been detected and the work area refilled with the code that did not compare at the top of both buffer registers, the comparator proceeds to compare the noncomparing line from the first buffer register holding the base reference program to each line of code in the second buffer register holding the revised version. This would be the same as an operator marking the position in the source listing of the base reference program and then proceeding to search the revised version until a match is made. Assuming that no match is made, the next line of code in the base reference file is used for a reference purpose and this line is compared against all of the lines of the revised code. Assume now that a match is made, that is, the entire line of the base reference program compares to some line in the revised version. Then the comparator program compares the next line of code in the first buffer register to the next line of code in the second buffer register and if this line does not compare, the program continues just as if no similarity was found in either of the two lines. Someplace along the way the comparator generally finds two consecutive lines of code that match identically with two lines in the revised version. The comparator then sets pointers to remember and identify these locations.

It is not a safe assumption that because two consecutive lines of the source code have been compared that all of the changes have been identified. For this reason the comparator program searches for a symbolic address in the base reference program and then searches in the revised program until the same symbolic address is found. The comparator program now has the modifications bracketed.

The comparator program then starts working backwards by comparing the line in the first buffer register just preceding the symbolic address, to the same line in the second buffer register. If a comparison is recognized, then the next preceding line in the first buffer register is compared to the next preceding line in the second buffer register. This procedure is continued until a noncomparison is sensed. The comparator program then compares the results of the two tests, the test for a comparison by working forward from the noncomparison and the test working backward from a like symbolic address, and assumes that the test defining the shortest number of lines in the buffer register, defines the noncomparing area.

The source code must compare within the boundary of the first like symbolic address to be considered a good comparison. If it is not within that boundary then the comparator program moves its pointer designator to another like symbol address and "justifies" the code in that bracketed area. By justify is meant to determine if the changes made are additions, deletions, modifications or all three. When this has been completed, the like symbols are treated as if they were the first lines of a code that did not compare. In this way the comparator program avoids the trap of assuming that because it found similar codes it is back in sequence. Working backwards from identical symbolic addresses to test for noncomparisons positively identifies the changed areas.

The flow diagrams for the comparator programs as performed by a computer are shown in FIGS. 2A to 2H. The source listing codes for the comparator program are shown in FIGS. 3A to 3G. The small circles shown in FIGS. 2A to 2H identify the portions of the source listing referred to in that section of the flow diagram. For instance, on FIG. 2A a small circle, containing the code OPTS and located on top of a flow block showing that the read in options is selected, refers to the source listing shown on FIG. 3A and similarly identified as OPTS in the source listing. Thus, the small coded circle identifies the source listing required to perform the operations shown in the block in the flow diagram preceded by the small coded circle.

FIGS. 3A, 3B, 3C, 3D, 3E, 3F and 3G show the significant portions of an exemplary program implementation of the comparator program according to the present invention. The program is written in the GMAP language described, for example, in the Honeywell Programming Reference Manual No. CPB–1004 for implementation on any Honeywell G600 and H6000 Series computer. Implementation of the present invention in the program of FIGS. 3A to 3G is apparent from an examination thereof and therefore except for comparison to the flow diagram of FIGS. 2A to H, is not described further herein.

Figure 2A:
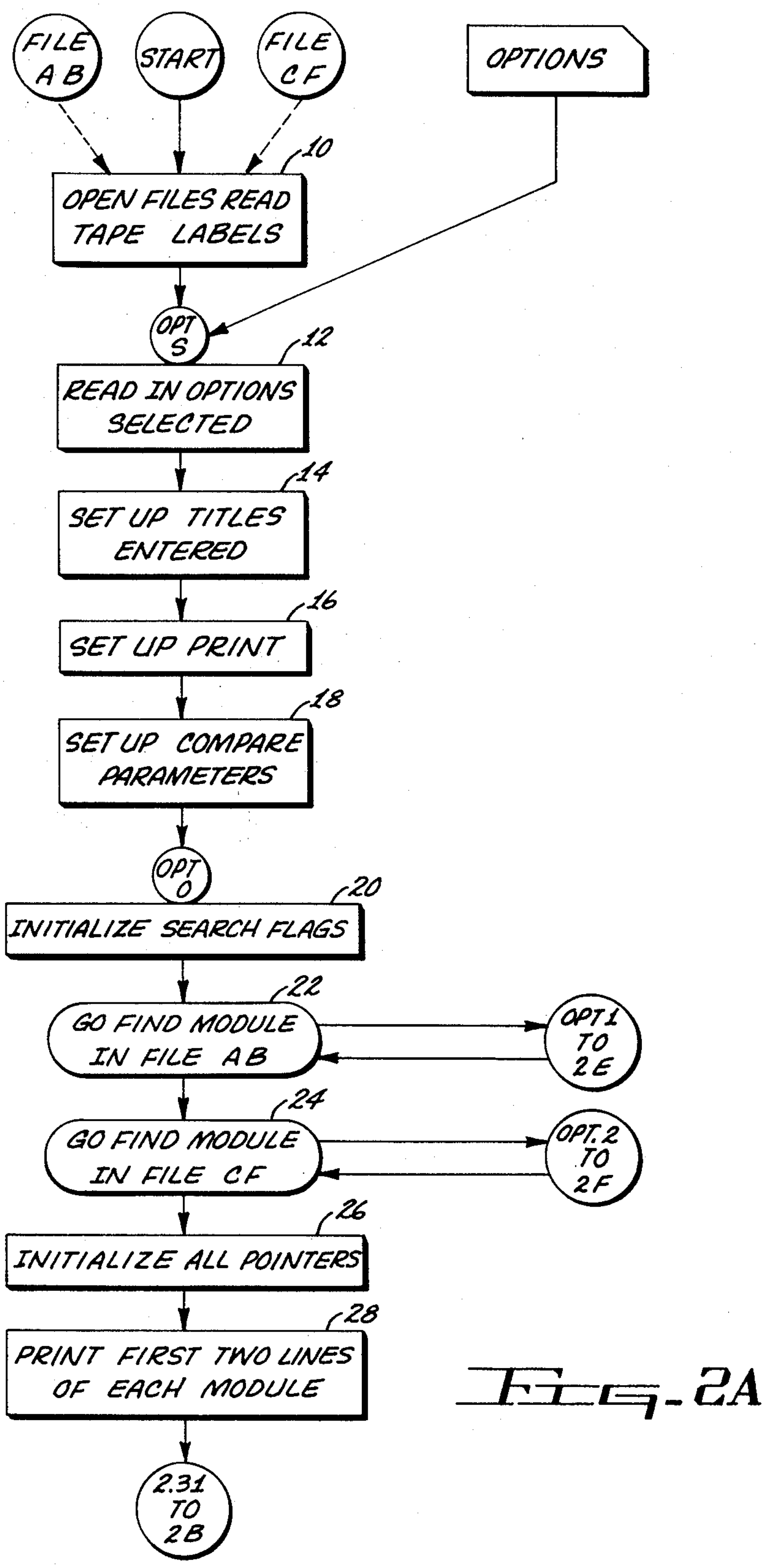
FIGS. 2A, 2B, 2C, 2D, 2E, 2F, 2G and 2H, show a flow diagram illustrating the machine algorithm performed by a data processing system in performing the source code comparison routine according to the present invention.

Referring now to FIG. 2A, the initial housekeeping and outlining of parameters based on the options selected is performed first. The first step, shown in block 10, is to open the files and read the tape tables from file AB, the base reference file, and file CF, the revised version file. The options for printing and the types of modifications required to be reported and printed are selected. The computer then continues in the flow to the OPTS coding, blocks 12, 14, 16, and 18, to read in the options selected, to set up the titles entered, to set up the printing in the required format, and to set up the required compare parameters.

The flow then continues on FIG. 2A to enter the OPTO coding, source listing shown on FIG. 3B, to initialize the search flags as shown in a block 20 and then to go to a next block 22 to find the base reference module in file AB. The flow branches to OPT1 coding shown on FIG. 2E. The flow diagram shown on FIG. 2E shows the steps for retrieving a record from the AB file and for storing these records into the first buffer register. When the buffer register is full the flow returns to the flow diagram on 2A to the next block 24 where the revised record is retrieved from file CF. The flow diagram shown on FIG. 2E will be described in more detail later.

Figure 2B:
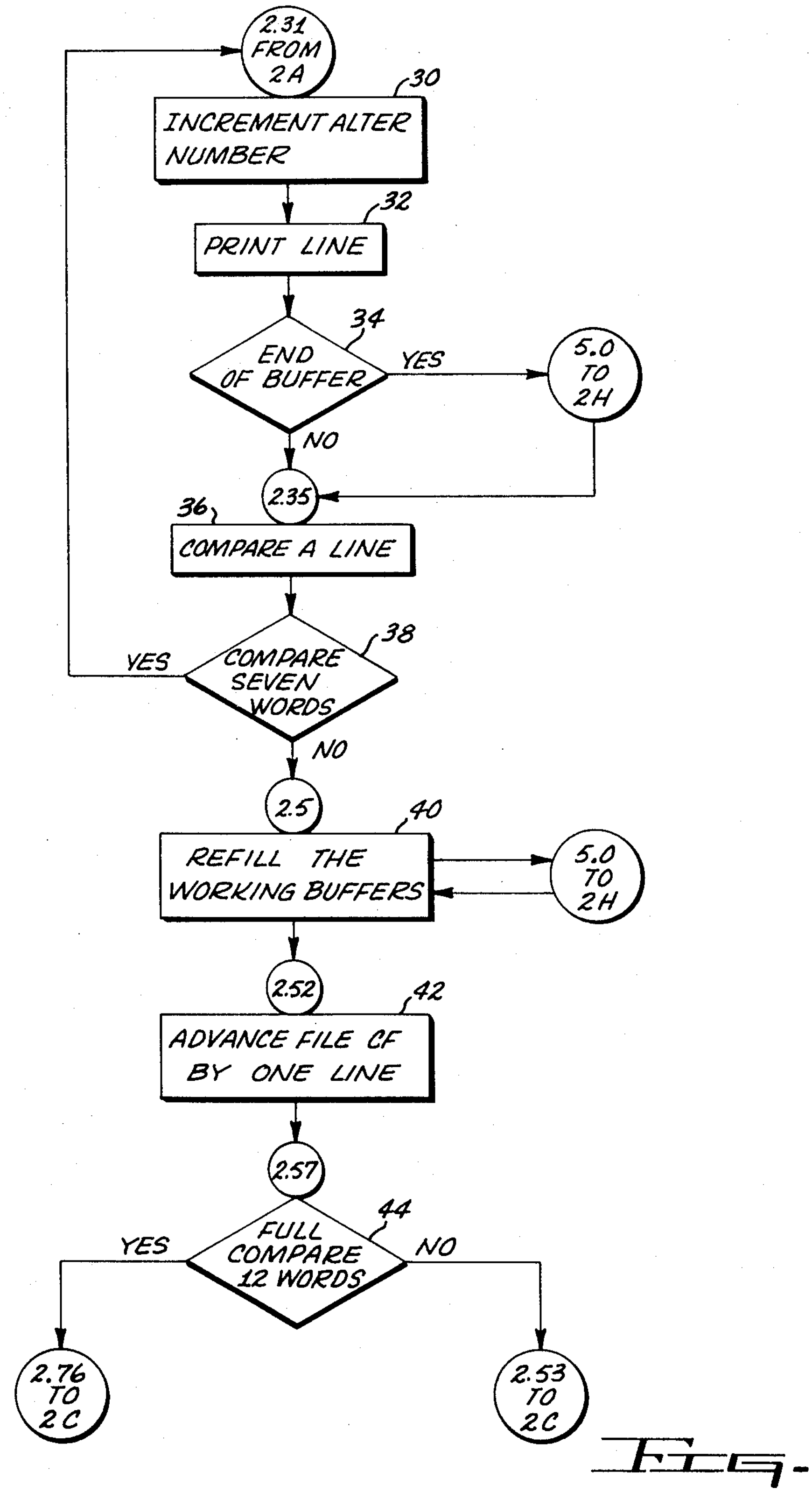
Figure 2C:
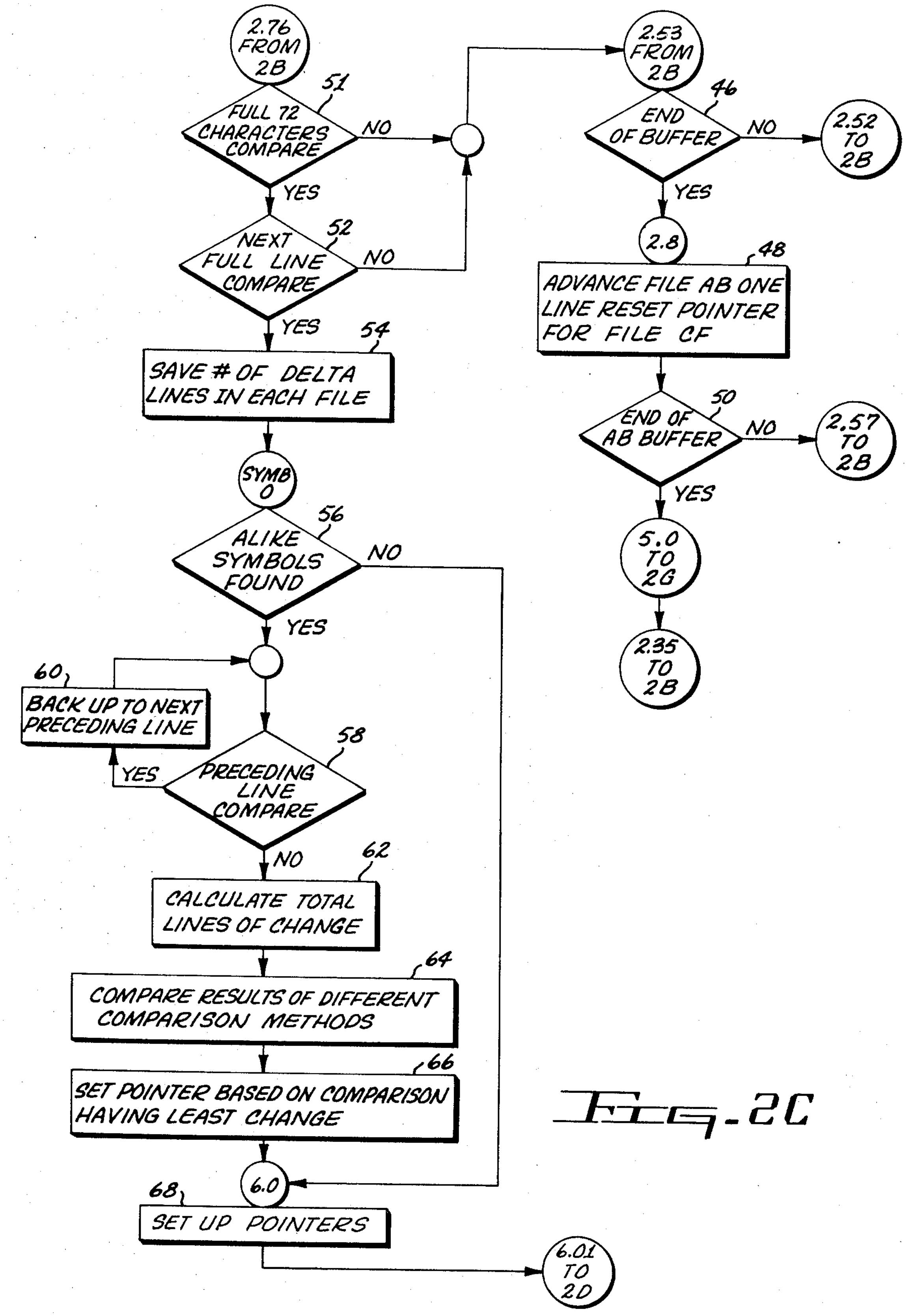
Figure 2D:
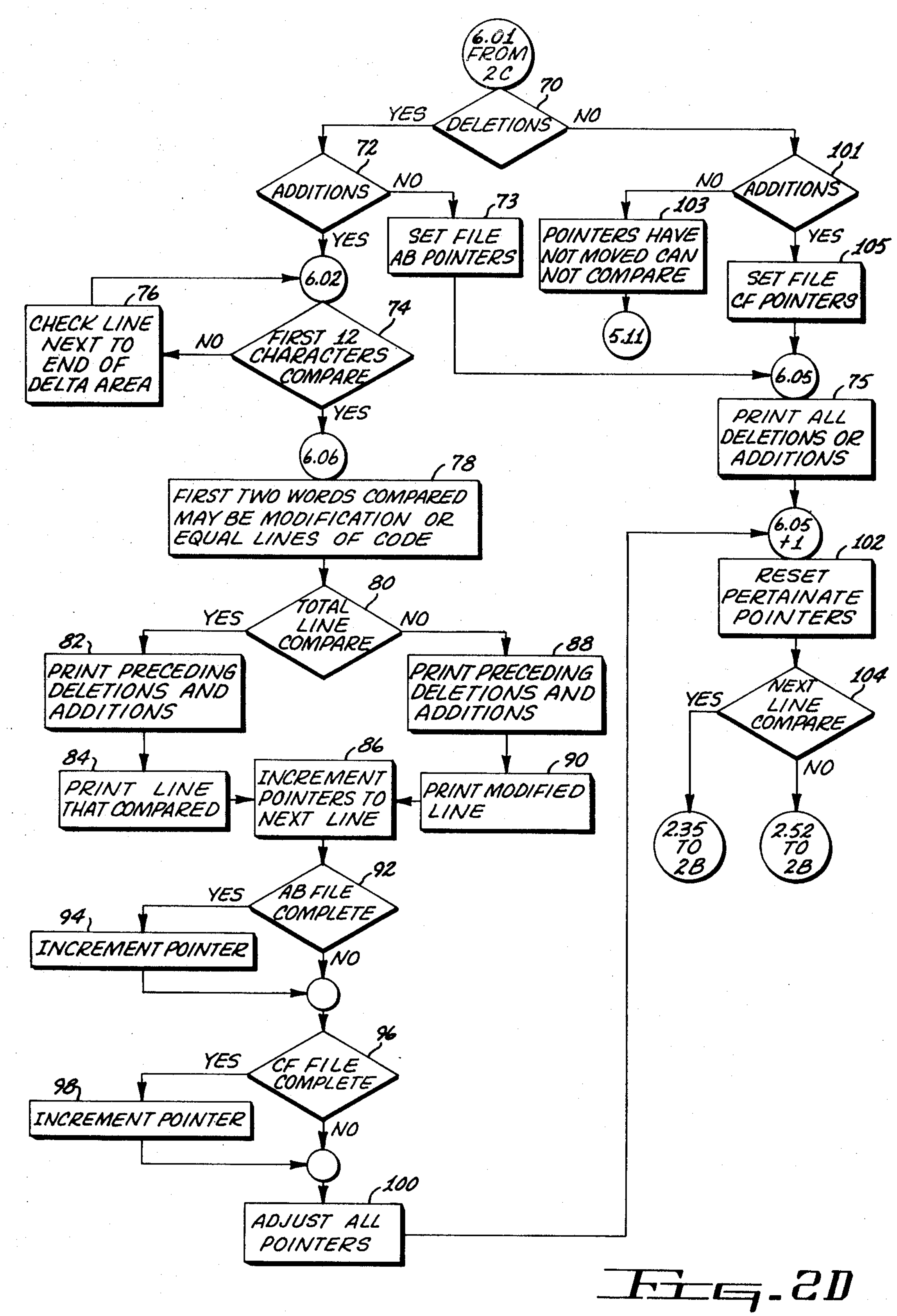
Figure 2E:
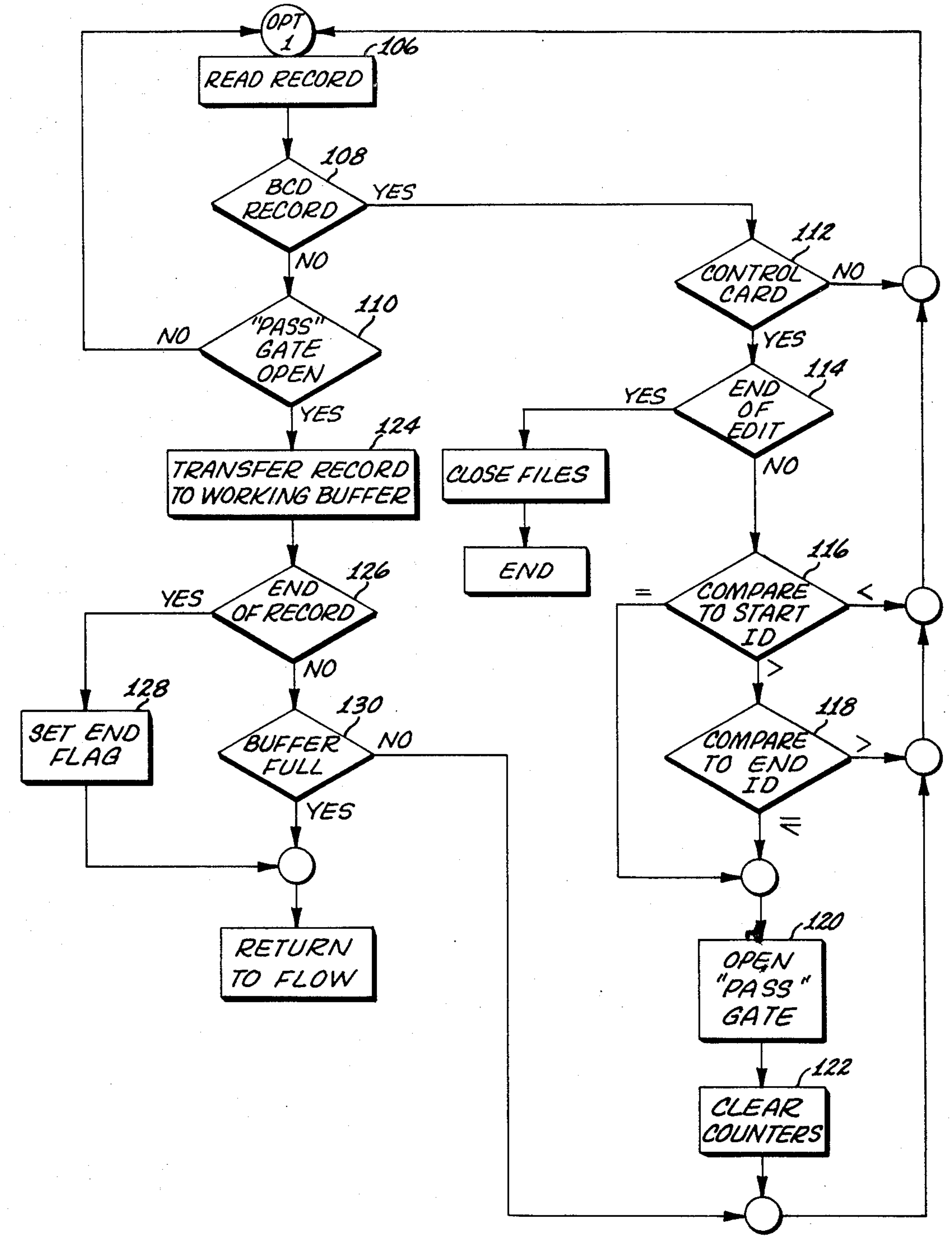
Figure 2F:
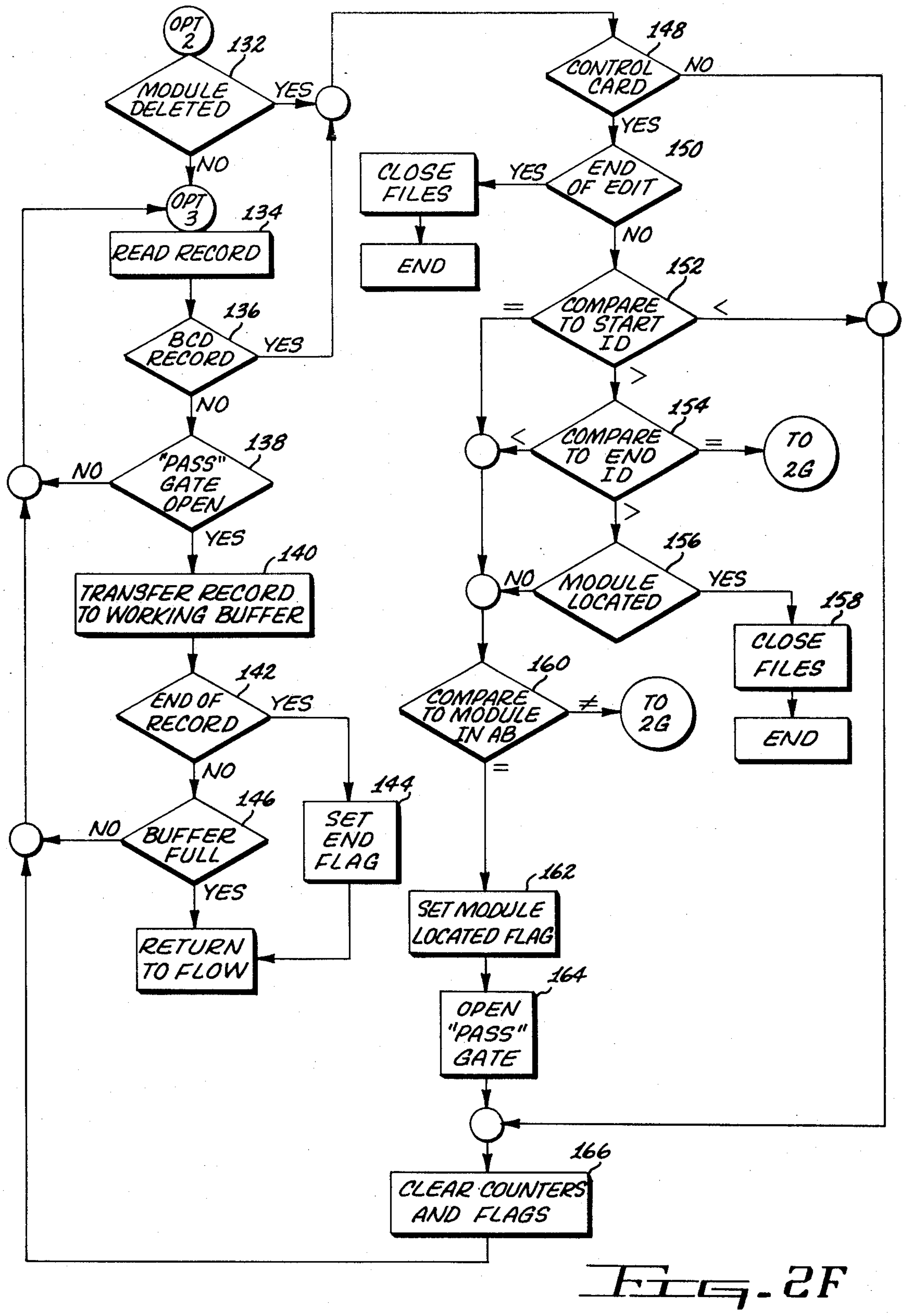

The branch from the block 24 is to the OPT2 coding shown on FIG. 2F. The flow diagram on FIG. 2F shows the steps required to retrieve the revised version module or record code from file CF and transfer the information to a second buffer register. The flow branches back from the flow shown in FIG. 2F to the flow shown in FIG. 2A when the second buffer register is filled with the revised program information. The flow shown on FIG. 2F for retrieving the information from file CF and loading the second buffer register will be described in more detail later.

Referring again to FIG. 2A, a block 26 in the flow diagram shows that all of the pointers are initialized. The comparator program employs a variety of pointers to track the progress and status of the comparison as the comparator program works its way through the file statements. A "pointer" is a symbolic referenced location in which is stored the address of a particular file statement in the working buffer area. The pointer is used to remember and identify the address location in the buffer register that points to a particular location which must be identified for future reference in the program.

The next block 28 in the flow diagram on FIG. 2A shows that the first two lines from each module are printed. These first two lines are printed to assist the operator in making sure that the correct modules are being compared and that the compare program is ready. The flow then continues to source code 2.31 which continues on FIG. 2B.

Referring now to FIG. 2B, further housekeeping functions are performed. These housekeeping functions are necessary after the module has been located and loaded into the working buffers. Thus, a block 30 shows that the alter number is incremented. The flow continues to a next block 32 to print the next line. The flow then continues to a decision block 34 where the end of buffer is checked. The decision block 34 checks to see if all of the lines presently in the buffer registers have been tested. If all of the lines have been tested, the yes decision is taken from the decision block 34 to another flow shown as code 5.0 on FIG. 2H to reload the buffer registers. The reloading of the buffer registers according to FIG. 2H will be described later. Generally the line being checked will not be an end of buffer, and the flow will continue from the decision block 34 out the no decision path to code 2.35 where a line in the base reference program is compared to a line in the revised version program as shown in block 36. In the buffer registers according to the preferred embodiment, a line is one address location in the buffer and defines 72 characters or 12 words.

In a decision block 38, seven words or 42 characters of one line in the first buffer are compared to seven words of the same line in the second buffer. If a comparison is found, the branch is from the yes decision path back to code 2.31 and the block 30, to circulate back through the flow to increment the alter number to compare another line. This circular flow continues until either the end of the buffer is reached at which time the flow branches to refill the working buffer registers or a noncomparison is found. The noncomparison of seven words causes a branch out the no decision path of the decision block 38 into the source listing code 2.5. At this point in the flow diagram as shown in a block 40, the working buffers are refilled to put the noncomparing word at the top of the buffer and to put any succeeding information in both the first and second working buffer registers until both buffers are completely filled. The flow then continues to code 2.52, block 40, where the next line from the CF file, the second buffer register, is checked to the line in the first buffer register that did not compare in the decision block 38.

In code 2.57, a decision block 44, the full comparison on all twelve words filling one line from both registers is performed. In the decision 40, the second buffer register containing the information from the CF file is checked line by line to the noncompared line in the second buffer register. If there is a comparison, meaning that one line of information was added to the revised file, the flow branches from the decision block 44 out the yes decision line to code 2.76 on FIG. 2C. If a full comparison is not found on the 12 words of the next line after the buffer register containing the CF file is advanced by one line, the no decision path from the decision block 44 is taken to code 2.53 on FIG. 2C.

On FIG. 2C, code 2.53 and the subsequent flow is checked for a comparison between the noncompared line from the first working register to each line in the second working register. If this line is not the end of buffer the flow branches out of the no decision path of a decision block 46 to code 2.52 on FIG. 2B. Referring again to FIG. 2B, the flow comes in at code 2.52 at the block 42 to check the next line in the second buffer register by advancing to the next line in the second buffer register. If the full comparison in the decision block 44 is still not found, the flow branches out of the no decision to again check for an end of buffer in the decision block 46. Again if it is not an end of buffer, the circular flow continues by advancing to the next line in the second working register. The circular flow continues until either a comparison is found causing a branch of the yes decision of the decision block 44 to code 2.76 to perform a third comparison, or, if the end of buffer is reached, the flow continues out of the yes decision of the decision block 46 on FIG. 2C to code 2.8 where file AB working register is advanced one line as shown in a block 48 and the pointer to the CF file buffer register, the second buffer register, is reset to where the noncomparison is found. It is in this manner that each line in the base register working buffer is compared line by line to every line that is stored in the modified version program buffer register. This flow continues until the end of the AB buffer register is reached, at which time the yes decision is taken from a decision box 50 and the first and second working buffers are refilled in the code 5.0 flow shown on FIG. 2G. After both buffer registers are refilled, the flow branches back to code 2.35 on FIG. 2B to continue with the comparison of the two buffer registers line by line to find another noncomparison.

Still referring to FIG. 2C if the end of AB buffer is not reached, the no decision causes the flow to branch to code 2.57 and the decision block 44 on FIG. 2B to continue the comparison until all of the lines in the AB file are checked.

Still referring to FIG. 2C, code 2.76 provides for another full line, 72 character, comparison as shown in a decision block 51. A comparison causes a branch from the yes decision from the decision block 51 to check for a comparison of the next full line in a decision block 52. If there is again another comparison meaning that two full lines have compared in consecutive order, the program has detected one change and the flow continues to a block 54 where the number of lines that were changed in each file are saved and the flow continues to a SYMBO code (see FIG. 3D) to a decision block 56 where like symbols are checked. In this section of the flow the first and second working buffers are compared to locate the next identical symbolic address. If alike symbols are not found meaning that there is no identical symbol stored in the memory, this means that there is no comparison in the information stored in the working buffers. The flow branches out of the no decision of the decision block 56 to code 6.0 to continue with the flow to identify the types of noncomparisons found.

If however alike symbols have been found, the flow branches out of the yes decision of the decision block 56 to work backwards up the working buffers to again identify the noncomparison. This is performed through a decision block 58 where the preceding lines are compared. If they do compare the flow branches out of the yes decision line of the decision block 58 to a block 60 to back up to the next preceding line and to return to the flow to check the preceding lines again. This flow continues in a circular path from decision block 58 to block 60 and returns until a noncomparison is found. When a noncomparison is detected identifying the previously discovered noncomparison, the total lines of noncomparison are calculated as shown in block 62.

The flow continues to the next block 64 where the results of the different comparison methods are compared. The next block in the flow diagram, block 66, sets the pointer based on the comparison having the least change. It is in this portion of the comparison flow that positively identifies the area of the change. The pointers are set to identify the line where the first noncomparison was detected and the line where the noncomparison ends. By performing the forward and the reverse comparisons all changes are located.

The flow then continues on FIG. 2C to source code 6.0 (FIG. 3F) to set up the pointers, and to code 6.01 on FIG. 2D to identify the type of modification that has been performed to the base reference program.

Referring now to FIG. 2D, after the pointers are set up to mark the beginning and end of the area of noncomparison in each of the two files, the flow continues to a decision block 70 where the changes are checked for deletions. Deletions occurred if all of the lines in the second buffer register compare to some line in the first buffer register. If there have been deletions the yes decision is taken from the decision block 70 to a decision block 72 where the changes are checked for additions. If there are no additions, the flow branches from the no decision path from block 72 to set the AB file pointer to locate the deletion, block 73. The flow continues to code 6.05 to print the deletions, block 75.

If there have been additions the yes decision is taken and the program branches to code 6.02, decision block 74, to double check that the next line of characters did compare. If there were additions, a line further down should compare to this first noncomparison line in the base reference program. If more than one source code was added to the base reference program, the first 12 characters would not compare and the no branch from the decision block 74 would be taken to another block 76 where the next line is checked to see if possibly two lines were added. This circular flow is continued to determine the number of added lines. When the comparison of the first twelve characters is found, the yes decision is taken from the decision block 74 to code 6.06. This code continues the determination of the type of change that was made between the base reference program and the modified version.

In code 6.06, block 78, the first two words of the noncomparison are compared to check that possibly the modification of equal lines of code may have taken place. If, in fact, this had taken place the yes decision line would be taken from a total line compare decision block 80. A block 82 in the path from the yes decision flow shows that the preceding deletions and additions are printed. Also printed, as shown in block 84, is the line that compared. This line is printed to delineate the change. The flow continues with a block 86 to increment the pointers to the next line. If the total lines did not compare and the no decision path is taken from the decision block 80, meaning that a modification has taken place, the preceding deletions and additions are printed as shown in a block 88. Also printed, as shown in block 90, is the modified line. The flow continues to the block 86 to increment the pointers to the next line.

Upon reaching the block 86, the flow continues to check whether the comparison has been completed in both the AB file and the CF file. An area in the buffer registers has been processed and now the program continues to check the remaining lines in the buffer register and the rest of the files in both the AB and the CF files for more modifications. Therefore, the flow continues from block 86 to check the AB file in decision block 92 and, if completed, to increment the pointer to the first buffer register, block 94. The next step in the flow is to check the CF file in decision block 96 and if all of the source codes have been checked, to increment the pointers in the second buffer register, block 98. All of the pointers are adjusted as shown in block 100 and the flow branches to the second line of the source code 6.05 to reset all of the pertinent pointers as shown in block 102. The comparison of the source codes in the base reference module to the source codes in the revised version module continues. In a decision block 104 the next lines in the first buffer register are compared to lines in the second buffer register and if a comparison exists, the flow branches to code 2.35 on FIG. 2B to enter the circular flow to check succeeding lines. The flow branches from the no decision of the decision block 104 to code 2.52 on FIG. 2B if the next lines do not compare. The no decision determines that an immediate noncomparison has been found and the flow enters the part of the comparison program that determines the size of the noncomparing portions.

Thus, in the flow diagram of the description of the compare program according to the preferred embodiment, the comparison of the source code is primarily on a bit-for-bit basis. The first two statements of the file are presented to the output file for printing regardless of the comparison results or the print option chosen. This aids in the identification of the module, both the base reference module and the modified version, the date of revision, and the level of revision. The comparison logic, starting with the third statement of each of the two files, looks for an equal statement in the modified file. Only the first 42 characters are compared in each statement at this point. The number of characters compared can be adjusted by changing one command in the initial comparison area.

The detection of a noncomparison causes a transfer to the search subroutine. The work areas are refilled, starting with the line in the buffer register that did not compare. Since 146 lines can be stored in the buffer registers of the preferred embodiment, 146 lines are provided in each of the files for comparison. The pointers are adjusted to point to the first file in each of the records and the search is started for an equal comparison of the lines of each of the two files. The base reference file statements are compared to each of the modified file statements in sequential order until a comparison is found. If an equal comparison cannot be found, then the next statement in the buffer register containing the base reference program is compared, one-by-one, against all of the lines in the modified version program buffer register. If none of the 146 statements in the base reference buffer register can be matched to a statement in the modified version buffer register, the comparison terminates.

When a successful comparison has been made in the search subroutine, pointers are set to mark those statements. The comparison program now proceeds to verify that it has in fact found the point in the two files that is the same. The two statements that were found equal on a small character comparison are rechecked to verify comparison on a full character check. If one comparison is found, the next statement in sequence is compared again on a full character check. If either part of this test is not passed, the compared program returns to the search subroutine. If the verification is successful, the comparison program has found two sequential statements in the buffer register containing the modified version of the program. The comparator program then proceeds to the symbolic verification. In this subroutine, the comparator verifies that it is still in the same area of both files by checking the symbolic address. This verification is performed by searching the source statements until a symbolic address is found in the AB file that is also present in the CF file. A set of pointers mark the location of these identical symbols. The comparator program then proceeds to check the statements preceding the identical symbolic addresses until a noncomparison is again detected. The pointers are adjusted to the statement preceding the symbolic address that did not compare.

Two tests have now been performed; the first in the search subroutine and the second in the symbolic verification subroutine. Each test resulted in the definition of an area of change. For the first test the area of change is a number of statements in the AB and CF files that follow the last statement transferred (AB1 and CF1) to the output routine but precede the first of the two statements that compared equal (AB2 and CF2). The number of statements so defined in the AB file ($AB2-AB1=AB3$) and the number of statements so defined in the CF file ($CF2-CF1=CF3$) make up the first test area of change, $T1$ where $T1=AB3+CF3$. The area of change produced by the second test is defined as those statements in the AB and CF files ($AB1$ and $CF1$) starting with the next statement to be transferred to the output routine and ending with the statements in the AB files ($AB4$) and in the CF files ($CF4$) that precede like symbols but do not compare. The number of statements so defined in the AB file ($AB4-AB1=AB5$ and so defined in the CF file ($CF4-CF1=CF5$) make up the area of change for the second test, $T2$, where $T2=AB5+CF5$ The comparative program selects results of the least magnitude by testing the equation $R=T2-T1$. If $R$ is positive, the first test is accepted as producing the results of the least magnitude. If $R$ is negative, the second test is accepted as having the least magnitude of difference. The pointers are adjusted accordingly and the comparator transfers to the output subroutine.

The output subroutine examines the statements within the change area and looks for a comparison of the first two words. If a comparison is found a pointer is set to that statement. All preceding statements in the AB file change area are marked as deletions and all preceding statements in the CF file are marked as additions. The print routine is entered to print the area of change while marking the area as either deletions or additions. If a comparison was found on the first two words, that statement from the AB and CF files is printed as a modification. The output subroutine continues processing statements in this manner until the change area in both the AB and CF files have been printed. The comparator program then returns to the initial compare subroutine until the next noncomparison is detected and the process is repeated. This process continues until an END statement is detected in either file. This is the only exact statement which is expected. When the END characters are present, this indicates the end of legitimate data in that file and any additional data is ignored. The comparator then checks the next module on the input file and if it falls within the range to be compared, processing continues. If not, the files are closed and the comparator program terminates.

A subroutine which has not been fully explained is the processing of data from file AB to the first buffer register as shown on FIG. 2E. Any time that the compare program wishes to branch to the AB file to retrieve more information from the AB file to be placed in the first buffer register, the subroutine shown in FIG. 2E is entered. This subroutine begins by entering the source listing code OPT1 (see FIG. 3A) where a block 106 shows that the flow starts by reading a record from the file. The flow continues to a decision block 108 to check whether the record is a BCD, binary coded decimal, record. If it is a BCD record, the yes decision path is taken to check the coding of the BCD record. The initial search of each module is for a control card to be compared to the other modules. The control card is a BCD record. Thus, when the parameters were selected, one of the means of identifying the module required is to check for the control card to locate the module in the AB file. If the module has not yet been found a no decision path from the BCD record decision block 108 will be taken to another decision block 110. In the decision block 110 the question is asked whether the pass gate is open or not. The pass gate is open when the correct module is located in the file. Thus, if the file has not yet been found and the record is not a BCD record, the no decision path will be taken from the BCD record decision block 108 to the pass gate open decision block 110 where the no decision will again be taken back to read another record. This circular path will be taken until a control card is received at which time the yes decision is taken from the decision block 108 to a control decision block 112.

If this BCD card is not a control card, the no decision path is taken from the control card decision block 112 to read another record looking for the control card. If this BCD record is in fact a control card, the yes decision is taken to a decision block 114 where the end of EDIT is checked. The end of EDIT card is the last card in the file and stops the comparison program when everything is completed. Since we are searching for the correct module the no decision will be taken out of the decision block 114 to another decision block 116 where the START ID code from the control card is compared to the parameters set up at the beginning of the program. The equal decision line will be taken if the control card received is the correct module. If the control card shows that the module named is less than that required the program returns to read another record because the correct module has not yet been reached. Since the modules are generally given an alphabetical name, less than means that the module named has a name that is listed lower in alphabetical order.

If, however, the required module ID is greater than the START ID, that is, it appears that the correct module has been passed, the flow continues to compare the control card ID to the parameter decided ending ID in a decision block 118. This branch would be taken in case the correct module has been passed for some reason or is incorrectly filed or missing from the file. Therefore, if the control card ID is greater than the END ID, the greater than decision line is taken from the decision block 118 to return to read another record to check to see if possibly a misfiling has occurred. If the control card ID being checked is equal to or less than the parameter ending identification, the flow continues to open the pass gate as shown in block 120 and allows the comparison. The next block 122 is to clear the counters and to return to read another record as shown in the block 106.

The next record will probably not be a BCD record and the no decision path will be taken from the decision block 108 into the next decision block 110 where the yes decision will be taken because the pass gate is now open. The flow will continue to transfer the records to the working buffer as shown in block 124 and to enter a decision block 126 where the end of record is checked. If it is the end of record, the end of record flag is set as shown in block 128 and the program branches to return to the flow that required the filling of the first working buffer register. If it is not an end of record, the no decision path will be taken from the decision block 126 to another decision block 130 where the next decision is checked for a full buffer. If the buffer is not full the no decision path will be taken to read another record and enter more storage into the first buffer register. If, however, on this record the buffer register is now full, the yes decision will be taken from the decision block 130 and the program branches to return to the flow that requested the filling of the first buffer register.

The flow representing the processing of data from a CF file into the second buffer register is shown on FIG. 2F. The reading in of records from the CF file, which is the file containing the modified version program, is transferred into the second buffer register in the same manner as that explained in FIG. 2E. The first decision however, as shown in decision block 132, is to check whether the entire module has been deleted from the CF file. If the entire module has been deleted meaning that a comparison will never be made, the yes decision is taken from the decision block 132 in order to enter the flow for checking the end of audit and to close the files and end the program. The flow continues through the no decision path provided that the module has not been deleted. A record is read from the CF files as shown in block 134 and a check is performed for a BCD record as shown in decision block 136 to see if we have reached a control card, and if this control card defines the correct module as that defined in the compare parameters. Since this flow is very similar to that used in transferring the records from the AB files to the first buffer register, it will not be described in detail.

After the correct module is located in the CF file the equal branch is taken from a decision block 152 to another block 160 where the module located flag is set as shown in block 162 and the pass gate to the CF files is opened as shown in block 164. This means that the second buffer register is now ready to receive the data from the CF files and the flow continues to clear the counters and the flags, block 166, and to start transferring the information from the CF files to the second buffer register by reading a record, block 134, checking for a BCD record, decision block 136, checking for the open pass gate, decision block 138, transferring the record to the second buffer register, block 140, checking for end of record, decision block 142 and for a full buffer, decision block 146, and returning to the flow if the buffer is full.

Figure 2G:
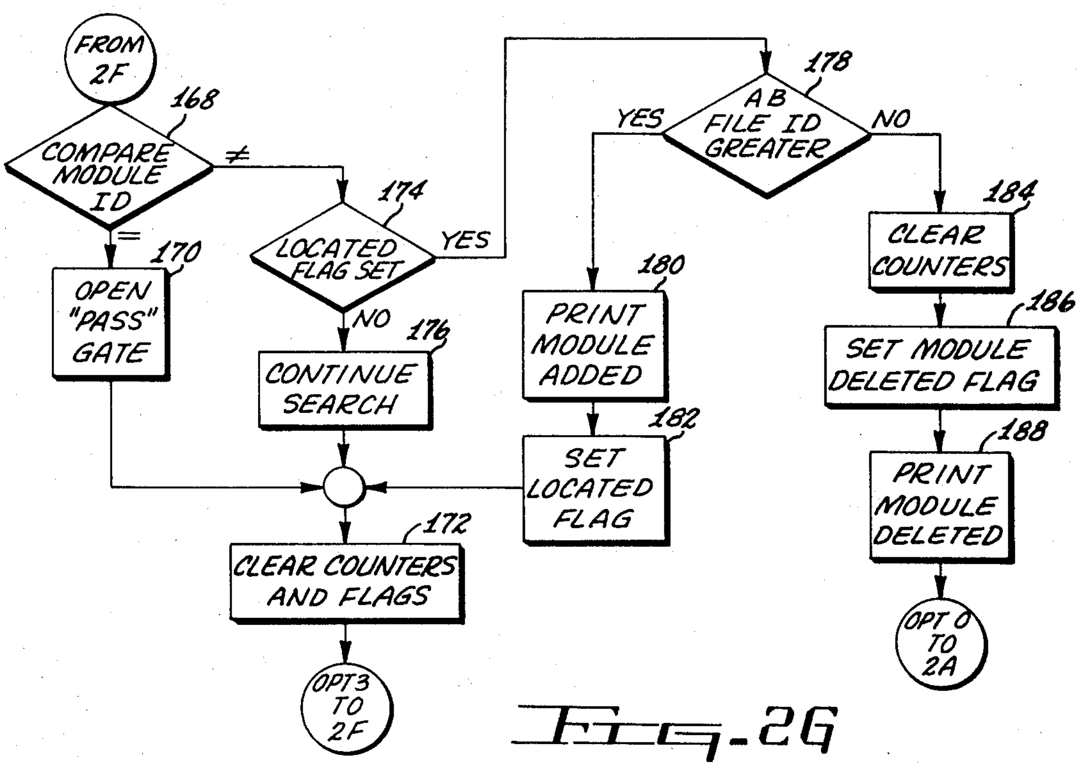

If in the decision block 160 no module can be found in the CF file that compares to the AB file, the not equal decision will be taken from the decision block 160 to FIG. 2G. The flow shown on FIG. 2G represents the decisions made in determining if a module has been added or deleted from the input files. The module ID is again compared in a decision block 169 to determine whether the ID is equal or not equal to the module in the AB file. If it is equal, the pass gate is opened as shown in block 170 and the flow goes back to code OPT3 and FIG. 2F after clearing the counters and flags as shown in block 172. If, however, the module IDs do not compare, the not equal decision line is taken from the decision block 168 to another decision block 174. The program is set up to continue looking for the missing record until the end of the tape or the end of the memory store is reached. The module required might be out of order. Thus, if the no decision path is taken from the decision block 174 indicating that the located flag was not set, the search continues, block 176, and the program returns to FIG. 2F at code OPT3 to continue the search through the records in the CF file.

If the located flag was set, the yes decision path is taken to another decision block 178 where the identification presently obtained is checked to the identification of the AB file. If the file ID in the AB file is greater, the yes decision is taken to print that a module has been added, block 180, and to set the located flag, block 182, and to clear the counters and the flags, block 172, and to return to the flow shown in FIG. 2F at the code OPT3 position. If the file ID in the AB file is not greater, the no decision is taken from decision block 178, the counters are cleared, block 184, and the module deleted flag is set, block 186, to show that the module required has been deleted and cannot be found. This information is printed as shown in block 188 and the flow returns to code OPTO in FIG. 2A to start over again.

Figure 2H:
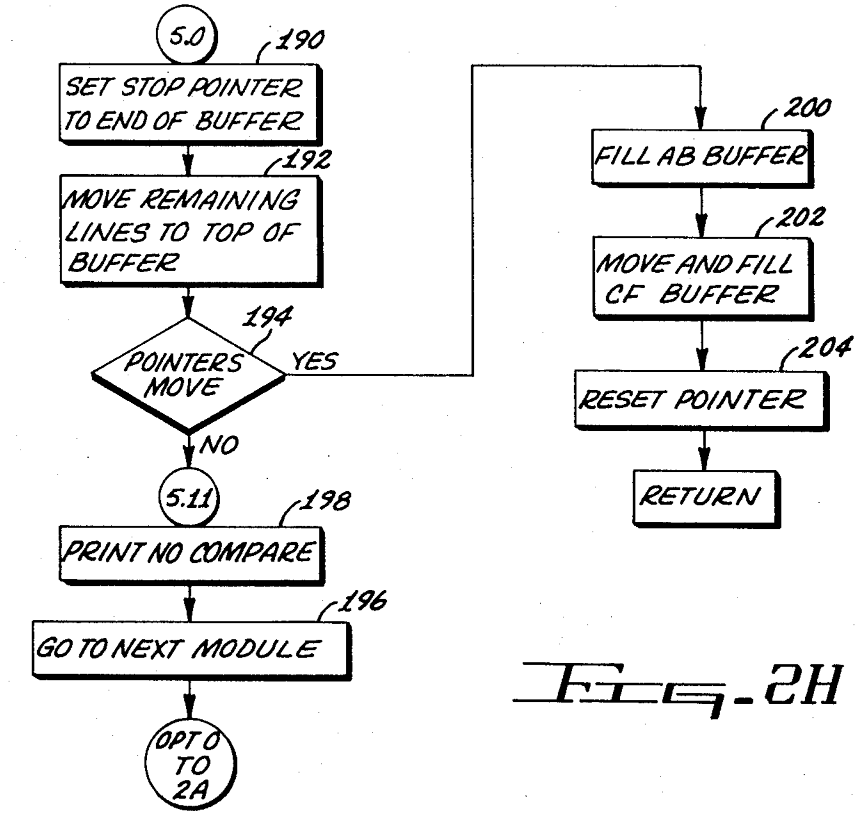

The flow shown in FIG. 2H represents the subroutine employed to refill the working buffers either after a noncomparison is found and moved to the top of the working buffers, or if all of the lines on the working buffers have been checked and no comparison has been found. The flow starts with code 5.0 to set the stop pointer to the end of the buffer register as shown in block 190 to identify the last record placed in the buffer register. The next block 192 moves the remaining lines to the top of the buffers. The flow continues to a decision block 194 where the movement of the pointers is checked. If the pointers have not moved, this means that no comparison has been found and that the next module must be checked to determine whether the next module is to be compared according to the input parameters, block 196. The operator is notified of a noncomparison by the "no compare" print, block 198. The flow returns to code OPT0 on FIG. 2A.

If, however, in the decision block 194 the pointers moved, the yes decision is taken from the decision block 194 and the buffer registers have space in which to store more information from the modules. Therefore, as shown in block 200, the information from the AB file is transferred to the first buffer register. The flow continues to move the noncomparing information to the top of the second buffer register and to fill the second buffer register with information from the CF file as shown in block 202. The flow continues to reset the pointers as shown in block 204 and to return to the flow for the continuation of the comparison with the buffer registers completely loaded with information from the modules that are to be compared.

The compare program according to the preferred embodiment has been designed to identify the changes made to the source code of a given program by comparing the modified or revised version against the base reference version. The input data is normally the source code file in compressed deck format stored on magnetic tape. It is, of course, obvious that the modules could be stored in any memory store format required for operation by the data processing system. The invention as disclosed should not be limited by the type of file used or the size of the buffer register nor the number of character comparisons taken in each comparison step. In the preferred embodiment one method of obtaining the base reference module is shown. Also, in the preferred embodiment a method is shown for identifying the identical module in the modified version. The method used in obtaining the module should not be taken to limit the present invention since many other types of identifiers could be used as well as many other flags could be used to identify the base reference module and the modified version module. Also the use of GMAP coding for the source listing should not be taken to limit the present invention to that language. Any skilled programmer, once shown the preferred embodiment according to the present invention, can code the comparator program flow diagram into any language for use on any type of data processing system.

It is to be understood that the above described embodiment is only illustrative to the application of the principles of the present invention. Modifications in this embodiment may be devised by those skilled in the art without departing from the spirit and scope of the invention. The appended claims are therefore intended to cover and embrace any such modifications.

What is claimed is:

1. In a data processing system, a process of comparing a modified version of a program to its base reference program to locate and signify a difference in coding comprising the steps of:

a. comparing source codes from both programs until a difference between codes is found;

b. testing for next equal comparison in the source codes after the compared source code difference is found;

c. locating an alike sequence in both programs;

d. testing for noncomparison by working backwards from the alike sequence located; and e. selecting the test that produces the smallest area of change as signifying the differences in coding.

2. A process according to claim 1 further including the steps of:

f. identifying the start and end of the area of difference;

g. comparing the area of change in the modified version to the base reference program to determine if the change is a deletion, an addition or a modification; and h. printing the area of change while signifying whether the change is a deletion, an addition or a modification.

3. A process according to claim 2 wherein step (g) comprises the steps of:

1. searching for a comparison in a small section of each line of coding in the area of change;
2. identifying the comparison in the area of change;
3. marking as deletions all of the statements preceding the identified comparison in the base reference program up to the identified start of the area of change;
4. marking as additions all of the statements preceding the identified comparison in the modified version program up to the identified start of the area of change; and
5. marking as a modification the line of coding having the comparison in the small section of a line of coding.

4. A process according to claim 3 further including the steps of:

6. repeating the steps of (1), (2), (3), (4) and (5) to search for more comparisons in a small section of each line of coding in the area of change, using the identified comparison as the start of the area of change; and
7. repeating step (6) until the end of the area of change is reached.

5. A process according to claim 1 further including the steps of:

f. identifying the start of the area of change;

g. identifying the end of the area of change;

h. searching for a comparison in a small section of each line of coding in the area of change;

i. identifying the comparison in the area of change;
j. marking as deletions all of the statement preceding the identified comparison in the base reference program up to the identified start of the area of change;
k. marking as additions all of the statements preceding the identified comparison in the modified version program up to the identified start of the area of change;
l. marking as a modification the line of coding having the comparison in the small section of a line of coding;
m. printing the area of change and signifying whether the change is deletion, addition or modification; and
n. continuing searching for more comparisons in a small section of each line of coding in the area of change by performing the steps of (h), (i), (j), (k), (l) and (m) using the identified comparison as the start of the area of change until the end of the area of change is reached.

6. In a data processing system, a process comprising the steps of:
a. setting up parameters defining a program module that is to have its base reference program module compared to a modified version of the program module;
b. locating said base module;
c. transferring the source code from said located base module into a first working buffer register;
d. locating said modified version module;
e. transferring the source code from said located modified version module into a second working buffer register;
f. comparing the source codes from the first working buffer register to the source codes from the second buffer register until a difference between the codes is located;
g. testing for a next equal comparison of lines of source codes between said first and said second working buffers;
h. locating an alike sequence in both programs after said coding differences;
i. testing for a noncomparison between said first register and said register by working backwards from said located alike sequence;
j. comparing the results of said tests; and
k. selecting the test results that defines the smallest area of change as signifying a difference in coding between the base reference and modified version program module.

7. A process according to claim 6 further including the steps of:
l. setting pointers identifying the start and end of the area of difference;
m. comparing the area of change in the modified version to the base reference program to determine if the change is a deletion, an addition or a modification; and
n. printing the area of change while signifying whether the change is a deletion, an addition or a modification.

8. A process according to claim 8 wherein step (m) comprises the steps of:
1. searching for a comparison in a small section of each line of coding in the area of change;
2. identifying the comparison in the area of change;
3. marking as deletions all of the statement preceding the identified comparison in the base reference program up to the identified start of the area of change;
4. marking as additions all of the statements preceding the identified comparison in the modified version program up to the identified start of the area of change; and
5. marking as a modification the line of coding having the comparison in small section of a line of coding.

9. A process according to claim 8 further including the steps of:
6. repeating the steps of (1), (2), (3), (4) and (5) to search for more comparisons in a small section of each line of coding in the area of change, using the identified comparison as the start of the area of change; and
7. repeating step (6) until the end of the area of change is reached.

10. In a data processing system, a process of comparing a modified version of a program to its base reference program to locate and signify the differences in coding comprising the steps of:
a. transferring the source code of the base reference program from a base module into a first working buffer;
b. transferring the source code of the modified version program from a modified version module into a second working buffer register;
c. comparing a shortened section of a next line from the first buffer register to a similar size section of a same line in the second buffer register;
d. going to step (e) if no comparison is found, otherwise returning to step (c);
e. moving the noncomparing lines to the top of their respective working buffer;
f. refilling the working buffers with the subsequent data from the base reference module and the modified version module;
g. advancing the second buffer register to look at the next line;
h. going to step (i) if an increased word length comparison is not found, otherwise going to step (o);
i. going to step (j) if an end of buffer is located, otherwise returning to step (g);
j. advancing by one line the line being compared in the first buffer register;
k. going to step (1) if the end of the first buffer register is signalled, otherwise returning to step (h);
l. refilling the first buffer register with source codes from the base register module;
m. refilling the second buffer register from the source codes of the modified version of the program;
n. returning to step (c);
o. rechecking the full characters of one line for a comparison;
p. going to step (q) if a comparison is found, otherwise returning to step (i);
q. checking the next full line character comparison of the first working buffer register to the next full line character of the second working buffer register;
r. going to step (s) if the next full line of both buffer registers compare, otherwise returning to step (i);

s. saving the number of noncomparing lines from the first working buffer register and the second working buffer register;

t. searching for identical symbolic addresses in both the base reference module and the modified version module;

u. checking for a comparison between the line preceding a like symbol in the first working buffer register to the line preceding the like symbol found in the second working buffer register;

v. going to step (w) if preceding lines compare, otherwise going to step (y);

w. comparing the next preceding line in the first register to the next preceding line in the second buffer register;

x. returning to step (w) if the preceding lines compare, otherwise going to step (y);

y. calculating the total lines of change found in the comparison according to steps (g) through (s) and (u) through (w);

z. comparing the results of the different comparison methods;

aa. setting pointers identifying the beginning and end of the noncomparing portions of the first and second buffer register based on the comparison having the least change;

bb. determining if the noncomparing portion is a deletion, an addition or a modification; and cc. printing the results of the process.

11. A process according to claim 10 wherein step (bb) comprises the steps of:

1. searching for a comparison in a small section of each line of coding in the area of change;
2. identifying the comparison in the area of change;
3. marking as deletions all of the statement preceding the identified comparison in the base reference program up to the identified start of the area of change;
4. marking as additions all of the statements preceding the identified comparison in the modified version program up to the identified start of the area of change; and
5. marking as a modification the line of coding having the comparison in the small section of a line of coding.

* * * * *